United States Patent [19]

Drent et al.

[11] Patent Number: 4,859,764

[45] Date of Patent: Aug. 22, 1989

[54] COPOLYMERIZATION OF CARBON MONOXIDE AND OLEFIN WITH NITROGEN CONTAINING PHOSPHINE LIGAND CATALYST

[75] Inventors: Eit Drent; Richard L. Wife; Petrus W. N. M. Van Leeuwen, all of Amsterdam, Netherlands

[73] Assignee: Shell Oil Company, Houston, Tex.

[21] Appl. No.: 88,169

[22] Filed: Aug. 21, 1987

[30] Foreign Application Priority Data

Aug. 22, 1986 [NL] Netherlands ............ 8602138

[51] Int. Cl.$^4$ ............................................. C08G 67/02
[52] U.S. Cl. ................................... 528/392; 502/167
[58] Field of Search .......................................... 528/392

[56] References Cited

U.S. PATENT DOCUMENTS

| | | | | |
|---|---|---|---|---|
| 2,495,286 | 1/1950 | Brubaker | ................ | 260/63 |
| 3,689,460 | 9/1972 | Nozaki | ................ | 260/63 |
| 3,694,412 | 9/1972 | Nozaki | ................ | 260/63 |
| 4,474,978 | 10/1984 | Drent | ................ | 560/24 |
| 4,634,793 | 1/1987 | Drent | ................ | 560/243 |
| 4,740,625 | 4/1988 | Drent | ................ | 528/392 |

FOREIGN PATENT DOCUMENTS

| | | |
|---|---|---|
| 121965 | 8/1984 | European Pat. Off. . |
| 181014 | 5/1986 | European Pat. Off. . |
| 213671 | 6/1986 | European Pat. Off. . |
| 1081304 | 3/1965 | United Kingdom . |
| 2058074 | 4/1981 | United Kingdom . |

OTHER PUBLICATIONS

Kirk Othmer Encyclopedia of Chemical Technology, Second Edition, vol. 12, p. 132, 1967.

*Primary Examiner*—Harold D. Anderson

[57] ABSTRACT

Polymers of carbon monoxide and at least one ethylenically unsaturated hydrocarbon, e.g., ethylene, are produced in the presence of novel catalyst compositions formed from a palladium compound, an anion of a non-hydrohalogenic acid having a pKa less than about 2 and certain bidentate ligands containing atoms of phosphorus and nitrogen.

9 Claims, No Drawings

COPOLYMERIZATION OF CARBON MONOXIDE AND OLEFIN WITH NITROGEN CONTAINING PHOSPHINE LIGAND CATALYST

The invention relates to an improved process of producing copolymers of carbon monoxide and at least one olefinically unsaturated hydrocarbon in the presence of catalyst compositions formed by contacting a palladium compound, an anion of a non-hydrohalogenic acid having a pKa less than about 2 and certain bidentate ligands which incorporate both phosphorus and nitrogen.

Copolymers of carbon monoxide and ethylenically unsaturated hydrocarbon(s) are known as polyketones. One class of these polymers is the class of linear alternating polymers of carbon monoxide and unsaturated hydrocarbon(s) polymerized through the ethylenic unsaturation. For example, when carbon monoxide and ethylene are polymerized, the polyketone polymer will consist of units of the formula $-CO(C_2H_4)-$. Such polymers are typically produced in the presence of a catalyst composition formed from a group VIII metal compound, e.g. a palladium compound, an anion of a non-hydrohalogenic acid having a pka less than about 2 and a monodentate ligand of phosphorus or a bidentate ligand of nitrogen. Although each type of these ligands is useful in the production of polyketone copolymers, it would be of advantage to have additional ligands available.

SUMMARY OF THE INVENTION

The present invention comprises an improved process of polymerizing carbon monoxide and at least one olefinically unsaturated hydrocarbon in the presence of novel catalyst compositions formed from a palladium compound, an anion of a non-hydrohalogenic acid having a pKa less than about 2 and a bidentate ligand containing atoms of both phosphorus and nitrogen. For simplicity, the ligands are described as a phenylphosphine having from 1 to 2 substituents incorporating a nitrogen atom not bound to hydrogen.

DESCRIPTION OF THE INVENTION

In the process of the invention, carbon monoxide is polymerized with at least one ethylenically unsaturated hydrocarbon. Preferred hydrocarbons are hydrocarbons of from 2 to 20 carbon atoms inclusive, more preferably from 2 to 10 carbon atoms inclusive. Such hydrocarbons are wholly aliphatic, including α-olefins such as ethylene, propylene, octene-1 and dodecene-1, or are arylalphatic olefins having an aryl substituent on a carbon atom of the ethylenic unsaturation such as styrene, p-methylstyrene and p-ethylstyrene. Preferred embodiments of the process of the invention prepare copolymers of carbon monoxide and ethylene or terpolymers of carbon monoxide, ethylene and a second ethylenically unsaturated hydrocarbon, particularly a second α-olefin and most particularly propylene.

The molar ration of unsaturated hydrocarbon to carbon monoxide in the polymerization mixture varies from about 10:1 to about 1:5 but preferably is from about 5:1 to abut 1:2. When ethylene and a second unsaturate hydrocarbon are employed to produce a terpolymer with carbon monoxide, the molar ration of ethylene to the second hydrocarbon is from about 400:1 to about 1:1 with ratios from about 100:1 to about 2:1 being preferred.

The palladium compound component of the catalyst compositions of the invention is a palladium salt of a carboxylic acid of up to about 10 carbon atoms. In part for reasons of availability, the preferred palladium carboxylate is palladium acetate although other carboxylates such as palladium propionate or palladium hexanoate are suitable.

The palladium compound is employed in conjunction with a non-hydrohalogenic acid having a pKa less than 2. Suitable acids are oxygen-containing acids and are inorganic acids, e.g., perchloric acid or sulfuric acid, or are organic acids including carboxylic acids such as trichloroacetic acid, difluoroacetic acid and trifluoroacetic acid as well as sulfonic acids such as para-toluenesulfonic acid, methanesulfonic acid and trifluoromethane sulfonic acid. The acids trifluoroacetic acid and para-toluenesulfonic acid constitute a preferred class of acids.

The anion is provided in the form of a free acid or alternatively in the form of a slat. Suitable salts include transition metal salts as well as non-transition metal salts but in general salts of non-noble transition metals, i.e., metals of Group IB-Group VIIB of the Periodic Table of Elements are preferred and particularly preferred are copper salts. In an alternate embodiment, the palladium compound and the anion are introduced as a single compound such as the complex $Pd(CH_3CN)_2(O_3S-C_6H_4-CH_3)_2$ prepared for example by reaction of palladium chloride with silver para-toluenesulfonate in acetonitrile.

The anion is provide in a quantity from about 0.5 equivalents to about 200 equivalents per gram atom of palladium (as the compound), preferably from about 1 equivalent to about 100 equivalents per gram atom of palladium.

The bidentate ligand employed in the catalyst composition of the invention is a bidentate ligand containing phosphorus and at least one atom of nitrogen. For ease of understanding, the ligand may be considered as a nitrogen-containing phosphine derivative wherein at least one substituent attached to the phosphorus is an organic radical incorporating at least one nitrogen free from hydrogen substituents. Suitable phenylphosphines are nitrogen containing phenylphosphines of the formula $$PA_3$$

wherein A is selected from phenyl and the nitrogen-containing substituent. The nitrogen-containing substituent is a substituent of from 2 to 20 carbon atoms, inclusive, preferably from 2 to 10 carbon atoms inclusive, containing from 1 to 3 but preferably 1 nitrogen free from substitution with hydrogen. The relative position of the nitrogen atom(s) and the phosphorus to which the substituent is attached is not critical although best results are obtained when from 1 to 3, preferably 2, carbon atoms separate the nitrogen moiety from the phosphorus to which the nitrogen-containing substituent is attached. Preferred substituents contain only atoms of carbon, hydrogen and oxygen in addition to the indicated nitrogen atom(s).

Each nitrogen moiety of each nitrogen-containing substituent is provided in any configuration which results in the nitrogen being free from hydrogen substitution, such as a cyano radical, an isocyano radical, dialkylamino radicals wherein the alkyls are lower alkyl of up to 6 carbon atoms, N,N-dialkylamido radicals wherein the alkyls are lower alkyl of up to 6 carbon atoms, and heterocyclic radicals containing only atoms of nitrogen and carbon in the ring such as pyridyl, and triazinyl.

Illustrative of phosphine ligands in which each of the phosphorus substituents is nitrogen-containing are tris(2-diphenylphosphinoethyl)amine and tris(2-cyanoethyl)phosphine and illustrative ligands in which two of the phosphorus substituents are nitrogen-containing are bis(2-pyridyl)phenylphosphine and bis(2-cyanoethyl)-phenylphosphine. The preferred type of phosphine ligand, however, is a diphenylphosphine ligand wherein the remaining phosphorus substituent is nitrogen containing. Illustrative of this preferred class are 1-[2-(diphenylphosphino)ethyl]pyrrole, 2-(diphenylphosphino)-N, N-dimethylacetamide, ortho-(diphenylphosphino)-N,N-dimethylaniline, N-[(diphenylphosphino)-methyldiethylamine, 2-cyanoethyldiphenylphosphine, 2-diphenylphosphino)-1,3,5-triazine and 2-pyridyldiphenylphosphine. The 2-cyanoethyl phenyl phosphines and the 2-pyridyl phenyl phosphines form a preferred class.

In the catalyst compositions of the invention the nitrogen-containing bidentate ligand is used in a quantity from about 0.1 mol to abut 100 ml per mol of palladium compound but preferably from about 0.5 mol to about 50 mol per mol of palladium compound.

In the catalyst compositions of the invention, it is preferred although not required to additionally provide a quinone. Suitable quinones include anthraquinones and naphthaquinones although benzoquinones are preferred, particularly 1,4-benzoquinone. The addition of a quinone is wholly optional and amounts of up to about 10,000 mol per mol of palladium compound are useful. In the embodiments employing quinone, amounts from about 10 mol to about 5000 mol per mol of palladium compound are preferred.

The catalyst composition formed from the palladium compound, the anion, the bidentate ligand and optionally the quinone is employed in catalytic amounts. Quantities of catalyst composition providing from about $1 \times 10^{-7}$ to about $1 \times 10^{-3}$ gram atom of palladium per mol of ethylenically unsaturated hydrocarbon are useful with preferred quantities of catalyst composition providing from about $1 \times 10^{-6}$ to about $1 \times 10^{-4}$ gram atom of palladium.

The polymerization process of the invention is conducted under polymerization conditions in the gas phase or in the presence of a liquid diluent. When diluent is used, a lower alkanol is preferred and particularly methanol or ethanol. Useful polymerization temperatures are from about 20° C. to about 200° C. and in particular from about 30° C. to about 150° C. Suitable pressures are from about 1 bar to about 200 bar with pressures from about 20 bar to about 100 bar being preferred. The method of contacting the reactants and catalyst composition is not critical and is accomplished, for example, by shaking or stirring. Subsequent to reaction the polymer is separated and recovered by conventional means, e.g., filtration or decantation. The polymer may contain catalyst residues which may be removed, if desired, by treatment with a solvent selective for the catalyst residues present.

The polymers of the invention are know polymers of known utility because of good mechanical properties. The products find utility as premium thermoplastics in fibers, films and injection or compression molding applications. They find utilization in the production of parts for the automotive industry, in the manufacture of containers for food and drinks, as construction and building applications an in similar applications. The polymer products are modified by mixing or blending with other polymeric materials to produce mixtures or blends with varied application.

The process and catalyst composition invention are further illustrated by the following Illustrative Embodiments and Comparative Example.

Comparative Example I

A carbon monoxide/ethylene copolymer was prepared by charging to a magnetically stirred autoclave of 250 ml capacity a catalyst solution comprising 50 ml of methanol, 0.1 mmol of palladium acetate, 2.0 mmol of para-toluenesulfonic acid and 0.3 mmol of triphenylphosphine. After removal of any air present by evacuation, ethylene was introduced until a pressure of 30 bar had been reached and carbon monoxide was added until a pressure of 60 bar had been reached. The contents of the autoclave were then heated to 110° C. After 5 hours the polymerization was terminated by cooling to room temperature and releasing the pressure. The polymer product was removed by filtration, washed with methanol and dried in vacuo at room temperature. The calculated polymerization rate was 5 g of copolymer/g Pd/hr.

Illustrative Embodiment I

A copolymer of carbon monoxide and ethylene was produced according to the procedure of Comparative Example I except that the catalyst solution contained 0.2 mmol of palladium acetate and 0.5 mmol of 2-cyanoethyldiphenylphosphine instead of 0.3 mmol of triphenylphosphine and the reaction temperature was 80° C. instead of 110° C. The calculated polymerization rate was 23.6 g of copolymer/g Pd/hr.

Illustrative Embodiment II

The procedure of Illustrative Embodiment I was repeated except that the reaction temperature was 100° C. instead of 80° C. The calculated polymerization rate was 40 g of copolymer/g Pd/hr.

Illustrative Embodiment III

The procedure of Comparative Example I was repeated to prepare a carbon monoxide/ethylene copolymer except that the catalyst solution contained 0.15 mmol of 3-(diphenylphosphino)-N,N-dimethylpropionamide instead of the 0.3 mmol of triphenylphosphine and contained 1.0 mmol instead of 2.0 mmol of para-toluenesulfonic acid, and the reaction temperature was 105° C. instead of 110° C. The calculated polymerization rate was 28.3 g of copolymer/g Pd/hr.

Illustrative Embodiment IV

The procedure of Comparative Example I was repeated to prepare a carbon monoxide/ethylene copolymer except that the reaction temperature was 80° C. instead of 110° C. and the catalyst solution contained 3.0 mmol of 2-pyridyldiphenylphosphine instead of triphenylphosphine and contained an additional 20 mmol of 1,4-benzoquinone. The calculated polymerization rate was 100 g of copolymer/g Pd/hr.

Illustrative Embodiment V

The procedure of Comparative Example I was repeated to prepare a carbon monoxide/ethylene copolymer except that the reaction temperature was 100° C. instead of 110° C. and the catalyst solution contained 3.0 mmol of bis(2-pyridyl)phenylphosphine instead of triphenylphosphine and additionally contained 20 ml of 1,4-benzoquinone. the calculated polymerization rate was 37.8 g of copolymer/g Pd/hr.

Illustrative Embodiment VI

When the procedure of Illustrative Embodiment I is repeated in the additional presence of propylene, a yield of a terpolymer of carbon monoxide, ethylene and propylene will be obtained at a good polymerization rate.

Through the use of $^{13}$C-NMR analysis, the copolymers of Comparative Example I and Illustrative Embodiments I-V were shown to have a linear alternating structure consisting of the units —CO($C_2H_4$)—. Each of these copolymers has a melting point of 257° C.

What is claimed is:

1. In the process of producing polymers of carbon monoxide and at least one ethylenically unsaturated hydrocarbon under polymerization conditions in the presence of a catalyst composition formed from a palladium compound, anion of a non-hydrohalogenic acid having a pKa less than about 2 and a phosphine ligand, the improvement wherein the ligand is a nitrogen-containing ligand of the formula $PA_3$ wherein A independently is a phenyl substituent or a nitrogen-containing substituent of from 2 to 20 carbon atoms and from 1 to 3 nitrogen atoms, and wherein at least one A is the nitrogen-containing substituent, each nitrogen-containing substituent incorporates at least one nitrogen atom that is free from substitution with hydrogen, and from 2 to 4 carbon atoms separate each nitrogen atom from the phosphorus atom to which the nitrogen-containing substituent is attached.

2. The process of claim 1 wherein the nitrogen of each nitrogen-containing substituent is provided in a radical selected from cyano, isocyano, dialkylamino, dialkylamido or heterocyclic having only carbon and nitrogen in the ring.

3. The process of claim 2 wherein the ligand is a nitrogen-containing diphenylphosphine ligand.

4. The process of claim 3 wherein the nitrogen-containing substituent is selected from 2-cyanoethyl or 2-pyridyl.

5. In the process of producing copolymers of carbon monoxide and ethylene under polymerization conditions in the presence of a catalyst composition formed from palladium acetate, anion of an acid selected from trifluoroacetic acid or para-toluenesulfonic acid, and a phosphine ligand, the improvement wherein the ligand is a nitrogen-containing ligand of the formula $PA_3$ wherein A independently is a phenyl substituent or a nitrogen-containing substituent of from 2 to 20 carbon atoms and from 1 to 3 nitrogen atoms, and wherein at least one A is the nitrogen-containing substituent, each nitrogen-containing substituent incorporates at least one nitrogen atom that is free from substitution with hydrogen, and from 2 to 4 carbon atoms separate each nitrogen atom from the phosphorus atom to which the nitrogen-containing substituent is attached.

6. The process of claim 5 wherein each nitrogen-containing substituent is provided in a radical selected from cyano, isocyano, dialkylamino, dialkylamido or heterocyclic having only carbon and nitrogen is the ring.

7. The process of claim 6 wherein the ligand is a nitrogen-containing diphenylphosphine ligand.

8. The process of claim 7 wherein the ligand is (2-cyanoethyl)diphenylphosphine.

9. The process of claim 7 wherein the ligand is 2-pyridyldiphenylphosphine.

* * * * *